(12) United States Patent
Miller et al.

(10) Patent No.: US 6,399,198 B1
(45) Date of Patent: *Jun. 4, 2002

(54) NONAQUEOUS SIZING SYSTEM FOR GLASS FIBERS AND INJECTION MOLDABLE POLYMERS

(75) Inventors: David G. Miller; Leonard J. Adzima, both of Pickerington; David J. Warner, Somerset, all of OH (US)

(73) Assignee: Owens Corning Fiberglas Technology, Inc., Summit, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/220,221

(22) Filed: Dec. 23, 1998

(51) Int. Cl.[7] ............... D02G 3/00; B65H 47/00; C08F 283/02

(52) U.S. Cl. ............ 428/392; 428/375; 428/378; 428/391; 525/106; 525/398; 525/461; 525/453; 427/174

(58) Field of Search ............... 428/375, 392, 428/391, 378; 525/106, 398, 431, 446, 453, 461, 537; 427/178

(56) References Cited

U.S. PATENT DOCUMENTS

| | | |
|---|---|---|
| 2,272,588 A | 2/1942 | Simison |
| 3,644,245 A | 2/1972 | Flanagan et al. |
| 3,837,892 A | 9/1974 | Marzocchi |
| 3,840,426 A * | 10/1974 | Flautt et al. .......... 57/153 |
| 3,997,306 A | 12/1976 | Hedden |
| 4,088,468 A | 5/1978 | Roberson |
| 4,136,069 A | 1/1979 | Vachon et al. |
| 4,173,680 A | 11/1979 | Vachon et al. |
| 4,248,936 A | 2/1981 | Marzocchi et al. |
| 4,298,653 A | 11/1981 | Maaghul |
| 4,500,600 A | 2/1985 | Wong et al. |
| 4,530,860 A | 7/1985 | Johnson |
| 4,537,917 A | 8/1985 | Hergenrother |
| 4,562,115 A | 12/1985 | Hergenrother |
| 4,567,102 A | 1/1986 | Pollet et al. |
| 4,581,392 A | 4/1986 | Armstrong et al. |

(List continued on next page.)

FOREIGN PATENT DOCUMENTS

| | | |
|---|---|---|
| GB | 880909 | 10/1961 |
| JP | 54106626 | 8/1979 |
| JP | 54120737 | 9/1979 |
| JP | 56078455 | 6/1981 |
| WO | WO 97/46495 | 12/1997 |
| WO | WO 98/51853 | 11/1998 |
| WO | WO 99/00543 | 1/1999 |

OTHER PUBLICATIONS

The Condensed Chemical Dictionary, Published by Van Nostrand Reinhold Company, published in the USA and Canada, Copyright 1971.

Primary Examiner—Cynthia H. Kelly
Assistant Examiner—J. M. Gray
(74) Attorney, Agent, or Firm—Inger H. Eckert; James J. Dottavio

(57) ABSTRACT

A nonaqueous sizing for glass fibers useful for reinforcement of polymers. The sizing composition comprises one or more film formers miscible with the polymer to be reinforced, one or more coupling agents and one or more powders. The sizing composition of the invention provides a glass fiber which has improved processability and notched izod without any loss in dispersability characteristics of the glass pellets.

19 Claims, 2 Drawing Sheets

U.S. PATENT DOCUMENTS

| | | |
|---|---|---|
| 4,604,325 A | 8/1986 | Pollet et al. |
| 4,609,591 A | 9/1986 | Pollet et al. |
| 4,774,135 A | 9/1988 | Bryant |
| 4,840,755 A | 6/1989 | Nakazawa et al. |
| 4,853,021 A | 8/1989 | Soszka et al. |
| 5,011,523 A | 4/1991 | Roncato et al. |
| 5,024,890 A * | 6/1991 | Pollet et al. ............... 428/372 |
| 5,026,410 A * | 6/1991 | Pollet et al. ............... 428/378 |
| 5,071,675 A | 12/1991 | Gupta et al. |
| 5,071,914 A | 12/1991 | Zimmel et al. |
| 5,156,913 A | 10/1992 | Collins et al. |
| 5,352,392 A | 10/1994 | Johnson et al. |
| 5,378,746 A | 1/1995 | Beyrle et al. |
| 5,387,468 A | 2/1995 | Pollet et al. |
| 5,405,895 A * | 4/1995 | Wu et al. ................... 524/188 |
| 5,425,796 A | 6/1995 | Loubinoux et al. |
| 5,998,029 A * | 12/1999 | Adzima et al. ............. 428/392 |

* cited by examiner

Viscosity of NEAT/Powder Sizes

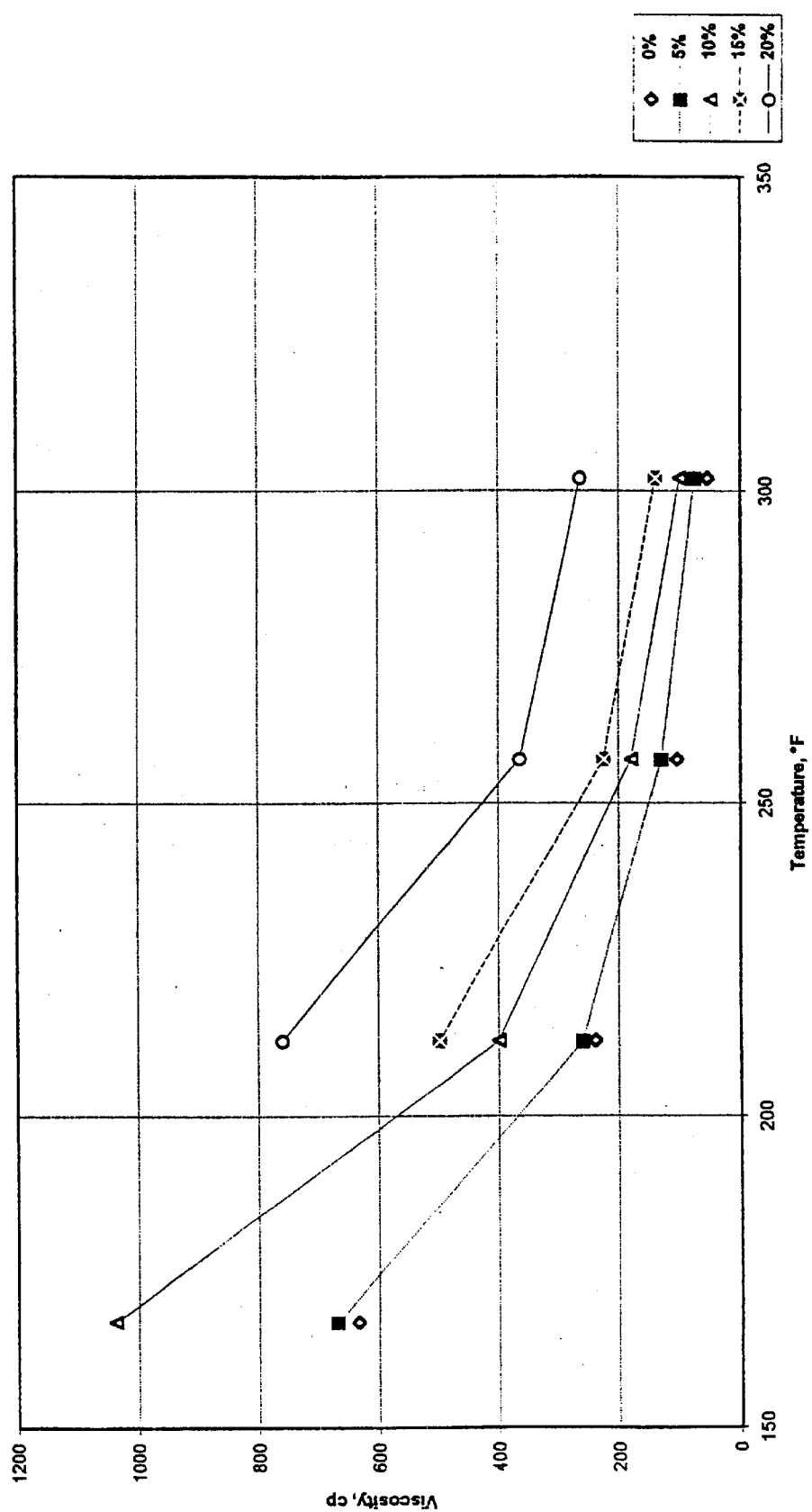

NONAQUEOUS SIZING SYSTEM FOR GLASS FIBERS AND INJECTION MOLDABLE POLYMERS

TECHNICAL FIELD AND INDUSTRIAL APPLICABILITY OF THE INVENTION

The present invention relates to the manufacture of chopped glass pellets for injection molding of reinforced polymers. In particular, the present invention provides sizing compositions and a process for the manufacture of glass fiber pellets having enhanced processability without any loss in dispersability characteristics of the glass pellets.

BACKGROUND OF THE INVENTION

Sizing compositions are well known and widely used in the manufacture of glass or carbon fibers to improve their processing properties, such as: fiber bundle cohesion, bundling, spreadability, resistance to fuzz formation, fiber smoothness and softness, abrasion resistance and easy and nondestructive unwindability of bobbined fiber bundles. Sizing compositions also affect the physical properties of the composite containing the treated fibers.

The reinforced plastic industry has been using glass fibers in various forms for reinforcing polymeric matrices to produce a variety of products. Glass fibers have been used in the form of continuous or chopped filaments, strands and rovings, as well as woven and nonwoven fabrics, meshes and scrims to reinforce polymers. Thermoplastic polymeric matrices have been reinforced with a variety of different forms of glass fibers resulting in the production of products such as: sheet molding compounds, bulk molding compounds, pultrusion products, panel products, spray up molding products, etc.

Production of glass fibers for the polymeric reinforcement market involves, attenuation of the glass fibers from molten streams of fiberizable glass material from a bushing or like device connected to a furnace containing molten fiberizable glass material. The glass fibers are attenuated by conventional means such as winders or high pressure air jets. In the process of producing glass fibers, a chemical composition is applied to them shortly after they are attenuated as the molten streams of glass. Prior to the present invention, the chemical composition has traditionally been an aqueous solution, foam or gel composition containing film forming polymeric materials, coupling or keying agents, lubricants and sometimes processing aids. This chemical composition or sizing is necessary in order to retard inter filament abrasion of the glass fibers when they are gathered into a bundle of glass fibers or strands. It is also required in order to make the glass fibers compatible with polymer matrices that they are used to reinforce. After application of the sizing, the fibers are then dried either in the package form or in the chopped strand form before they are used for reinforcement.

Prior to the present invention, the next step in using glass fibers as reinforcement for molded polymers involved production of either a short fiber composite or a long fiber composite. In general, the production of short fiber composites involved mixing pure polymer pellets with the chopped glass fibers such that the glass fibers were dispersed throughout the polymer when extruded. Pultrusion is used to produce long fiber composites where hot, thermoplastic polymer is forced through the glass roving so as to make the composite. This process method for manufacturing the glass polymer composite is expensive and very slow mainly due to high viscosity of thermoplastic polymer.

As discussed above, the chopped glass fibers are commonly used as reinforcement materials in thermoplastic articles. Typically, such fibers are formed by pulling molten glass into filaments through a bushing or orifice plate, applying a sizing composition containing lubricants, coupling agents and film forming binder resins to the filaments, gathering the filaments into strands, chopping the fiber strands into segments of the desired length and drying the sizing composition. These chopped strand segments are thereafter mixed with a polymerizable resin, and the mixture is supplied to a compression or injection molding machine to be formed into glass fiber reinforced plastic articles. Typically, the chopped strands are mixed with pellets of a polymerizable thermoplastic resin, and the mixture is supplied to an extruder wherein the resin is melted, and mixed with the chopped strands thus, the integrity of the glass fiber strands is destroyed and the fibers are dispersed throughout the molten resin, the fiber length is decreased and the fiber/resin dispersion is formed into pellets. These pellets are then fed to the molding machine and formed into molded articles having a substantially homogeneous dispersion of the glass fibers throughout.

Unfortunately, however, chopped glass fibers made via such processes are typically bulky and do not flow well. Consequently, such fibers are sometimes difficult to handle and have, on occasion, been problematic in automated processing equipment.

Most attempts for improving the process have been directed toward compacting the chopped strands. The work was aimed at improving flowability of the chopped strands which would presumably enable the use of automated equipment to weigh and transport the glass fibers for mixing with thermoplastic resins.

Such a process is disclosed in U.S. Pat. No. 4,840,755, wherein wet chopped strands are rolled, preferably on a vibrating carrier, to round the strands and compact them into denser cylindrically-shaped pellets. However, while the disclosed methods do tend to provide denser, more cylindrically-shaped pellets exhibiting better flowability, the disclosed methods and apparatus are undesirably limited in certain respects. For example, the pellet size and fiber content is generally limited by the size and number of fibers in the chopped strand. Although separated strands or loose filaments reportedly adhere to other strands during the rolling process, the process is designed to avoid multiple chopped strand segments from adhering together to form pellets containing more fibers than are present in a single chopped strand. Consequently, to obtain pellets having a suitable bulk density and a sufficient ratio of diameter to length to exhibit good flowability, the strand from which the segments are chopped usually must be formed from a large number of filaments. However, increasing the number of filaments required to be formed and combined into a single strand undesirably complicates the forming operation.

Although the disclosed pellets can be made by such diverse mixing processes, it has been discovered that many of such processes are either too inefficient to be used commercially, or cannot be adequately controlled to produce a uniform pellet product that provides the resulting composite article with strength characteristics comparable to those made from nonpelleted chopped strand fibers. For example, the use of a modified disk pelletizer as described in U.S. Pat. No. 4,840,755 frequently results in excessive residence time of the formed pellets within the mixer, which results in degradation of the pellets due to the abrasive nature of glass fiber pellets rubbing against one another. Such pellet degradation ultimately reduces the strength characteristics of the molded articles made therewith.

In an attempt to overcome these shortcomings, U.S. Pat. No. 5,578,535 discloses glass fiber pellets that are from about 20 to 30 percent denser than the individual glass strands from which they are made, and from about 5 to 15 times larger in diameter. These pellets are prepared by hydrating cut strand segments to a level sufficient to prevent filamentization but insufficient to cause the strand segments to agglomerate into a clump, and mixing the hydrated strand segments for a time sufficient to form pellets. Suitable mixing includes any process that will keep the fibers moving over and around one another and include processed described as tumbling, agitating, blending, commingling, stirring and intermingling. However, although the disclosed pellets can be made by such diverse mixing processes, it has been discovered that many of such processes are either too inefficient to be used commercially, or cannot be adequately controlled to produce a uniform pellet product that provides the resulting composite article with strength characteristics comparable to those made from nonpelleted chopped strand fibers. For example, the use of a modified disk pelletizer as described in the patent frequently results in excessive residence time of the formed pellets within the mixer, which results in degradation of the pellets due to the abrasive nature of glass fiber pellets rubbing against one another. Such pellet degradation ultimately reduces the strength characteristics of the molded articles made therewith.

In summary, the previous attempts to improve upon chopped glass fiber strand technology have mainly been directed at the short fiber lengths (about 6 mm) and lower glass contents (about 30%); in an effort to maintain dispersion of the glass fibers in the injection molded part. This has resulted in a trade off in processability. Along with the processing and dispersion requirements, the industry has also been attempting to alleviate environmental concerns by finding ways to minimize levels of VOCs while maintaining the physical properties of the fibers. This has given rise to the use of NEAT (nonaqueous elevated application temperature) sizings. With NEAT sizings, the resins are not emulsified or mixed with solvents, therefore, the VOCs are significantly reduced. In addition, in the present invention the coupling agents, or more particularly, the silanes are not mixed in water; this in some cases reduces hydrolization and may decrease the release of VOCs into the production environment. This is demonstrated in U.S. patent application Ser. No. 081885,882, assigned to Owens-Corning now U.S. Pat. No. 5,998,029

Accordingly, a need exists for a method of processing fibers with a sizing composition that adds processability to the NEAT sized glass fibers while preserving the excellent dispersability in the molded product. Not only is such a need fulfilled by the process and composition of the invention below, but the invention has the additional aspect of increasing the notched Izod strength of the molded parts while also allowing for higher glass contents.

SUMMARY OF THE INVENTION

The present invention provides a nonaqueous sizing composition and process that controllably yields highly processable chopped glass fibers that increase the notched Izod values of injection molded products reinforced with the pellets. The resulting glass pellets can be used in the manufacture of any long fiber product requiring high properties. For example, the product of the invention may be used in injection and compression molded parts useful in the automotive industry, such as the internal parts of a car, without any loss in physical characteristics while being more processable.

Prior to the discovery of the present sizing composition, it was necessary to keep the molecular weight of the sizing low in order to cut down on drag. This resulted in problems of maintaining pellet integrity. However, the present invention allows for the addition of higher molecular weight materials which allows for the use of higher temperatures. This results in a chopped glass pellet having physical characteristics and processability comparable or better than those normally seen only in wirecoated pellets.

One embodiment of the nonaqueous sizing of the present invention contains one or more film formers which are miscible with the polymer to be reinforced and one or more coupling agents and one or more high molecular weight powders. The sizing contains no water and is applied at high temperatures.

BRIEF DESCRIPTION OF THE DRAWINGS

FIG. 1 and FIG. 2 demonstrate that the addition of 5% powder showed negligible effects on viscosity and that the addition of 20% merely doubled it.

DETAILED DESCRIPTION AND PREFERRED EMBODIMENTS OF THE INVENTION

Figure 1:
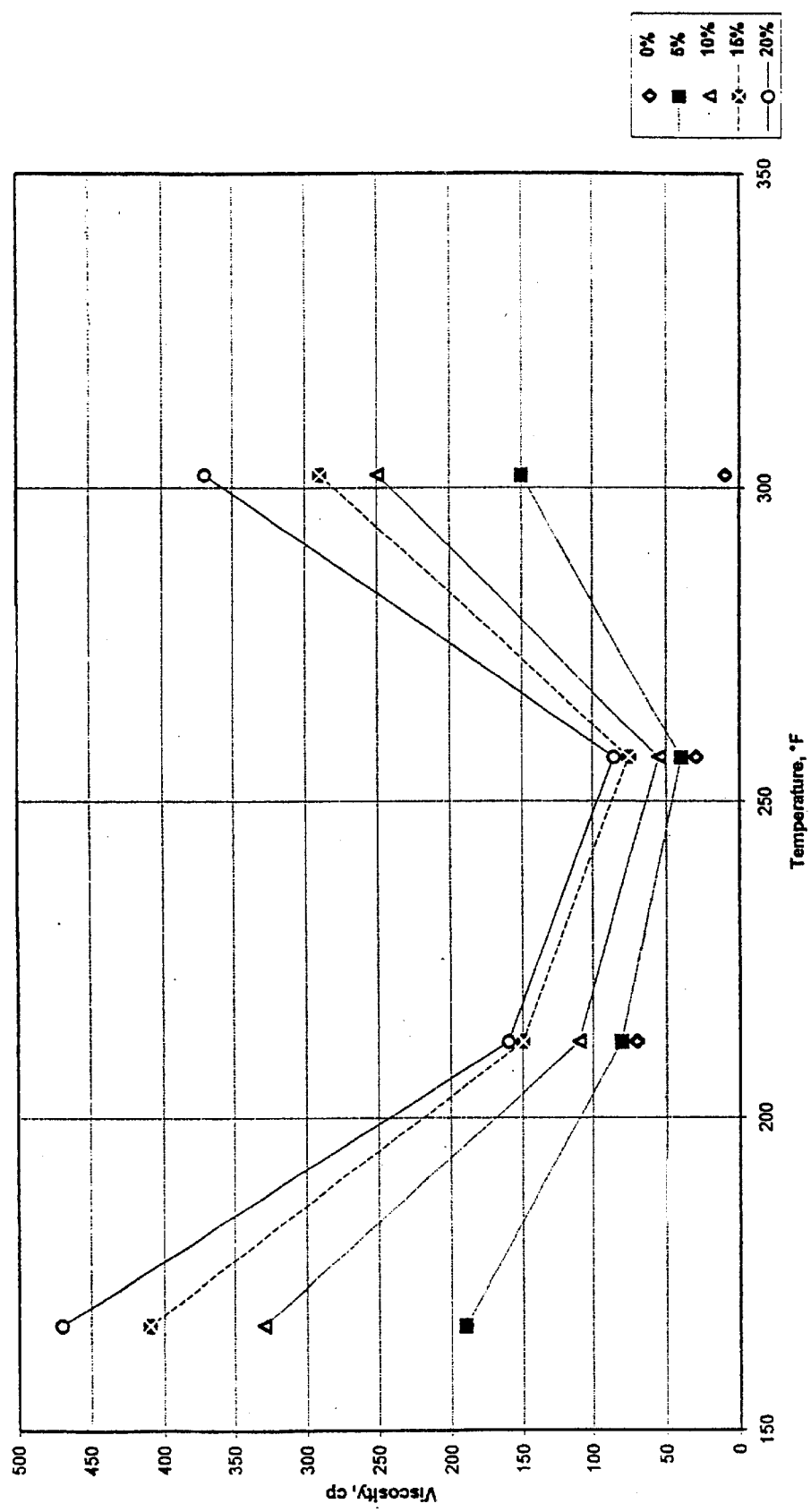

In the process of the invention, a strand of substantially continuous glass fibers is formed by conventional techniques such as drawing molten glass through a heated bushing to form a multitude of substantially continuous glass fibers and collecting the fibers into a strand. Any apparatus known in the art for producing such fibers and collecting them into a strand can suitably be used in the present invention. Suitable fibers are fibers having a diameter of from about 10 to 30 microns, and suitable strands contain from about 50 to 45,000 fibers. Preferably, the strands formed in the process of the invention contain from about 4,000 to 5,000 fibers having a diameter of from about 17 to 25 microns.

The nonaqueous sizing composition of the present invention is comprised of one or more film formers; one or more coupling agents; and contains one or more high molecular weight powders.

The preferred high molecular weight powder is polar and couples to the glass fibers in an oven consolidation step. Suitable powders add molecular weight and toughness to the sizing without a substantial increase in viscosity of the nonaqueous sizing composition. Suitable polar high molecular weight powders include nylon powders, such as ORGASOL 2001 EXD NAT 1 polyamide; ORGASOL 2001 UD NAT1 polyamide; and ORGASOL 2001 UD NAT2 polyamide, and have a molecular weight ranging from about 12,000 to about 65,000. In a preferred embodiment, the molecule weight ranges from about 18,000 to about 50,000. A preferred powder is orgasol polyamide 12 of 5 microns (obtained from Elf Atochem North America). Preferably the powders are added in an amount of from about 1% to about 20% with 5 to about 15% being the most preferred. The preferred film former should be a solid at room temperature with a viscosity of 50–400 cps at 100° C. and have sufficient molecular weight to be essentially nonvolatile.

Preferably the coating viscosity is less than 500 cps when applied in forming to avoid excess drag and tension on the fibers. In one embodiment, this is achieved by selecting a film former of a low molecular weight (typically below 8,000) and an acceptable forming temperature (usually 300° F. or lower for safety and manufacturing reasons). In addition, the powder cannot melt or dissolve at the applicator in order to avoid the powder forming agglomerated balls and increasing the size viscosity.

The preferred coupling agent should be a liquid at room temperature. Suitable coupling agents include organofunctional silanes, 3-glycidoxypropylltrimethoxy silane and 3-methacryloxypropyltrimethoxy silane. The preferred coupling agent for use in the invention is 3-aminopropyltriethoxy silane commercially available from OSi Specialties of Witco under the trade designation A-1100. Preferably, the organofunctional silanes are used in an amount of from about 0.5 to about 4% of the sizing composition with 2% being the most preferred.

Film formers useful in the invention include film formers miscible with the polymer to be reinforced. Polymers which may be reinforced using the present invention include nylon, polypropylene, polybutylene, terephthalate, nylon 6, nylon 66, chemically coupled polypropylene, polycarbonate, polyphenylene sulfide, thermoplastic polyurethane, acetal, and high density polyethylene ("HDPE"). In a preferred embodiment, the film former has a molecular weight that is lower than 8000. For example, with nylon, suitable film formers include polycaprolactones such as TONE 0310 and 0260 obtained form Union Carbide. For reinforcing polypropylenes, suitable film formers would include amorphous waxes such as VYBAR 260 and 825 obtained from Petrolite. Other preferred film formers include high and lower molecular weight amorphous waxes not listed above, microcrystalline waxes, lower molecular weight polyester alkyds, saturated and unsaturated polyesters, and low molecular weight maleated polypropylenes, as well as other hydrocarbon polymer film formers that are miscible with the polymer having a molecular weight under 8000.

In addition to the required components needed to prepare the invention, other components normally added to glass or carbon fiber sizing compositions can also be present. For example, the sizing composition of the invention may contain antistatic agents, cross-linking agents or hardeners, antioxidants, cationic lubricants for reducing fuzzy or broken filaments, nonionic lubricants, nucleating agents, or small amounts of pigment, etc. An example of a cross-linking agent would be bis-silane.

In the process of the invention, a strand of substantially continuous glass fibers is formed by conventional techniques such as drawing molten glass through a heated bushing to form a multitude of substantially continuous glass fibers and collecting the fibers into a strand. Any apparatus known in the art for producing such fibers and collecting them into a strand can suitably be used in the present invention. Suitable fibers are fibers having a diameter of from about 10 to 30 microns, and suitable strands containing from about 50 to 45000 fibers. Preferably, the strands formed in the process of the invention contain from about 4000 to 5000 having a diameter of from about 17 to 25 microns. In a particularly preferred embodiment, the strands have a diameter from about 20 to about 23 microns.

The nonaqueous sizing composition can be applied to the glass or carbon fibers by any method known to those skilled in the art such as during the formation of the glass fibers or after the glass fibers have cooled to a sufficient temperature to allow the application of the nonaqueous sizing composition. The nonaqueous sizing composition can be applied to glass fibers by applicators having belts, rollers, sprayers, and hot melt applicators.

Preferably the sizing composition is applied by a heated applicator which is capable of applying or metering small amounts of sizing uniformly to a continuous glass strand. Stationary and dual roll applicators may be used, however, the preferred applicators are ¾" roll-slot size applicator, ⅜" roll-slot size applicator, dual roll applicator and multiple split slot applicator. The most preferred is a ¾" roll-slot size applicator.

The ¾" roll-slot applicator typically has a ¾ inch diameter with a graphite or steel roll; the bottom block is heated. This applicator provides a single pass size flow with reduced drag compared to a standard applicator such as those typically used in the art. With this applicator there is also the advantage that the roll speed is adjustable via the gear train and inverter drive. In addition, it is well suited for viscosities in the 50–400 cps range and handles add-on rates in the 0.5 to 8% range or higher.

A ⅜" roll-slot applicator differs in that the roll diameter is ⅜" and the bottom block is heated. This applicator also provides a single pass size flow with slightly lower drag compared to a ¾" roll-slot. Like the ¾" applicator, the roll speed is adjustable via the gear train and inverter drive. In addition, this applicator has been shown to be useful for viscosities in the 50–400 cps range while handling add-on rates of from about 0.3 to 3% or higher.

An apparatus is provided for producing sized glass fibers. The apparatus comprises: a heated bushing for supplying streams of molten glass to be drawn into continuous fibers; a device adapted to draw the streams into the fibers; and a sizing applicator. The sizing applicator includes a housing and a roll applicator which is rotatably coupled to the housing. The housing has a supply port adapted to receive sizing composition under pressure from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact and alter sizing composition thickness of the sizing composition received on the roll applicator.

The roll applicator preferably rotates about a central axis which lies in a generally horizontal plane. The exit slot may be positioned above the horizontal plane such that the sizing composition exits the housing and is received on the outer surface of the roll applicator above the horizontal plane.

The roll applicator further includes first and second end portions. In one embodiment, the first end portion has first spirals or threads and the second end portion has second spirals or threads. The first and second spirals are of opposite hands so as to divert sizing composition which contacts the first and second end portions inwardly as the roll applicator rotates. Preferably, the passageway has a cross-sectional area which is generally constant from the supply port to the exit slot.

The apparatus further includes drive apparatus for effecting rotation of the roll applicator. The drive apparatus comprises a motor assembly and a clutch assembly. The motor assembly includes a motor having an output shaft and a drive pulley coupled to the output shaft so as to rotate with the output shaft. The clutch assembly includes: a clutch housing; a first shaft rotatably mounted in the housing and including an inner bore; a second shaft positioned in the bore and including an annular shoulder and a distal end portion adapted to engage the roll applicator such that rotation of the second shaft effects rotation of the roll applicator; a spring positioned in the bore and engaging the annular shoulder of the second shaft; a spring retainer secured to the first shaft so as to rotate with the first shaft and engaging and retaining the spring in the bore; and a belt positioned about the drive pulley and a portion of the first shaft such that rotation of the drive pulley effects rotation of the first shaft. The spring effects rotation of the second shaft upon rotation of the first shaft. The portion of the first shaft may comprise a drive pulley mounted to the first shaft.

The distal end portion of the second shaft preferably includes a pin which extends generally transversely to a central axis of the second shaft. The pin is adapted to engage a pin-receiving notch provided in the roll applicator.

In accordance with a second aspect of the preferred apparatus, a sizing applicator is provided for applying a coating of sizing composition to glass fibers. The applicator comprises a housing and a roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially alter sizing composition thickness of the sizing composition received on the roll applicator.

In accordance with a third aspect of the preferred apparatus, a sizing applicator is provided for applying a coating of sizing composition to glass fibers. The sizing applicator includes a housing and roll applicator which is rotatably coupled to the housing. The housing has a supply port adapted to receive sizing composition from a sizing supply source, an exit slot and a passageway extending from the supply port to the exit slot. The passageway receives sizing composition from the supply port and delivers the sizing composition to the exit slot such that the sizing composition exits the housing and is received on an outer surface of the roll applicator. The roll applicator is spaced from the housing such that the housing does not substantially contact the sizing composition once it is received on the roll applicator.

A dual roll applicator is useful when handling sizes having viscosities in the 1–200 cps range while needing add-on rates in the 1–15% range. This type of applicator allows for precise control of film thickness.

The sizing is applied using a heated applicator capable of applying or metering small amounts 3–225 gm/min of sizing uniformly distributed to a glass strand. Preferably the applicator system has a diameter of from to ¼" to 1" and is fed via an H series Zenith pump.

The nonaqueous sizing of the present invention may be applied at temperatures ranging from 30° C. to 150° C. Preferably, the sizing is applied at a temperature of no less than 300° F. In a particularly preferred embodiment, the sizing is applied at 100 degrees centigrade.

The sizing may be applied at viscosities ranging from 75 to 500 cps. Preferably, the sizing is applied in the range of 100 to 250. In a particularly preferred embodiment, the nonaqueous sizing is applied at a viscosity of about 200 cps.

Another important variable is the amount of sizing to be applied to the glass. In traditional chopped strands the LOI % by weight of sizing on the glass or carbon fiber is 1% or less, with short fiber compounds normally being about 0.5% to 1% sizing. Thus the influence of the size on the matrix is relatively small. In contrast, the sizing of the present invention has a size amount that ranges from 2–10%. As a result, the function of the sizing is broadened such that not only does it provide good adhesion while offering protection and good processing characteristics, but it also becomes a significant component of the matrix. In particular, for the present invention, the large amount of size on the glass allows the wirecoated glass fiber to disperse evenly throughout the thermoplastic polymer during the molding process.

One method for determining the LOI to be used is to apply sizing in an amount sufficient to essentially fill the interstices of the glass strand. This requires a determination and measurement of the interstices. The calculation uses the density of the glass filament and the density of the sizing. The formula is as follows:

Area of a hexagon circumscribing a circle of radius r=n*r*r*tan (pi/6)

Assume r=1 cm

Area of hexagon (glass plus size)=3.4641 $cm^2$

Area of circle (glass)=pi $cm^2$

Area of size=3.4641=pi=0.3225 $cm^2$

Volume of each (assume height=1 cm)
  size 0.3225 $cm^3$
  glass=pi $cm^3$

Weight of size=(1 $gm/cm^3$) (0.3225 $cm^3$)=0.3225 gm

Weight of glass=(2.53 $gm/cm^3$) (pi $cm^3$)=7.948 gm

Total weight of size and glass=8.2707 gm

Percent by weight of size=3.9%

The sizing may be applied at amounts ranging from 2–10%. Preferable, the sizing is applied in the range of 2 to 5. In a particularly preferred embodiment, the sizing is applied to a glass fiber for nylon reinforcement at an LOI of from 3.0 to 4.0% with the most preferred LOI being 3.5%. In a particularly preferred embodiment, the sizing is applied to a glass fiber for coupled polypropylene reinforcement at an LOI of from 2 to 5% with the most preferred LOI being 3.5%. However, as can be recognized from the discussion and formula above, the preferred LOI will vary with the glass filament density and sizing density. For example, a 23 micron filament has a preferred LOI of about 3.5%; whereas a 20 micron filament has a preferred LOI of about 4.1%; a 16 micron filament has a preferred LOI of about 5.0%; and a 13 micron filament has a preferred LOI of about 6.2%. Thus, with more surface per gram of glass, more sizing is needed.

Thus, in one embodiment, a sizing composition for treatment of glass fibers is provided comprising: one or more film formers miscible with the polymer to be reinforced; one or more coupling agents; and one or more high molecular weight, powders. The film former may be any film former which is of sufficient molecular weight to be essentially nonvolatile, has a viscosity range of 50–400 cps at 100° C. and is compatible with the thermoplastic matrix. For example, a film former such as polycaprolactone would be used so as to be miscible with a molding compound such as nylon 66. The coupling agents may be any ones which are compatible with the film formers selected. For example, coupling agents compatible with polycaprolactone film formers would be various amine functional silanes. In addition, the film former may be any film former as discussed above with the added characteristic that it is of sufficiently low molecular weight that the coating viscosity of the composition is below 500 cps when applied so as to avoid excess drag and tension on the fibers. Suitable film formers are miscible with the polymer to be reinforced with a preferred one having a molecular weight below 8,000.

Suitable high molecular weight powders have a molecular weight ranging from 12,000 to 65,000 with preferred powders ranging from 18,000 to 50,000. In addition, the preferred powder is polar and does not melt or dissolve on the applicator. Further, the powder particle diameter must be small enough to pass through the metering pump used to apply the size. The particle diameter should be chosen so as to be smaller than the fiber diameter. In a preferred embodiment, the particle diameter ranges from about ¼ to about ¾ the fiber diameter. A particularly preferred powder is Orgasol 2001 NAT UD with a molecular weight around 18,000 and a particle diameter of 5 microns. Other suitable powders include those obtained by any process which results in a very fine nylon particle that tends to have enough basic groups necessary to adhere to the acidic fiber surface.

Coupling agents suitable for the nonaqueous sizing composition will generally have ethoxy hydrolizable groups or silicon, since those having a methoxy group generally give off a more dangerous material when hydrolized. In addition, coupling agents are chosen so as to avoid any significant chemical side reactions.

The process of the invention requires: (a) coating the glass filaments with a sizing composition comprising one or more film formers miscible with the polymer to be reinforced; one or more coupling agents; and one or more high molecular weight powders; (b) cutting the glass fiber strands to form chopped strand segments; and (c) curing the pellets in a fluidized bed or vibrating oven such as a Cratec oven. The pellets are heated to just above the melt temperature of the powder so as to allow flow between the strands. This typically results in a solid cylindrical pellet.

Once formed, the strand is chopped into lengths of from about ⅛ inch to 1¼ inch. Any suitable means known in the art of chopping glass fiber polymer strands into such lengths can be used in the process. Suitable fiber chopping devices include Conair-Jetro model #204T 90060, Bay City, Mich.

Drying can be accomplished in any manner known to the art. However, in order to reduce drying time to a level acceptable for commercial mass production, it is preferred that the fibers are dried at elevated temperatures of from about 250° F. to 560° F. in a fluidized bed oven, such as a Cratec oven.

EXAMPLE I

Nonaqueous Sizing Containing High Molecular Weight Powders

The sizing formulas for this example are designated "A", "B" and "C" and are a shown below: The AC1702 and TRILENE 4038 liquid copolymers were obtained from Uniroyal, The film formers or waxes VYBAR 260, were obtained from Petrolite.

| | % weight |
|---|---|
| A | |
| AC 1702 | 73.5 |
| VYBAR 825 | 24.5 |
| A1100 | 2.0 |
| B | |
| TRILENE 4038 | 53.9 |
| VYBAR 260 | 44.1 |
| A1100 | 2.0 |
| C | |
| Polyester alkyd "C" | 49.0 |
| Tone 0260 | 49.0 |
| A1100 | 2.0 |

The polyester alkyd, "C", was prepared as follows:

TABLE 1

"C" - Polyester alkyd characterization

Starting Materials:

1. propoxylated bis-phenol A
   2. maleic anhydride

Composition of "C" Polyester

Monomers in Polyester

| | | |
|---|---|---|
| 1. maleic acid | 0.4% by wt | |
| 2. fumaric acid | 0.04% by wt | |
| 3. propoxylated bis-phenol A | 34.3% by wt | |
| | RI detector | UV detector |
| No. avg. molecular weight, $M_n$ | 550 | 510 |
| Wt. Avg. molecular weight, $M_w$ | 620 | 600 |
| Z avg. molecular weight, M | 750 | 710 |
| polydispersity, d | 1.13 | 1.17 |
| VOC, %  0.74 | | |
| Acid #  60.3 | | |
| Visc, ICI, cp  140 | | |

The TONE 0260 (polycaprolactone) was obtained from Union Carbide and has the following formula:

$$H\{O(CH_2)_5C(=O)\}_m\text{—}O\text{—}R\text{—}O\text{—}\{C(=O)(CH_2)_5O\}_mH$$

TONE 0260, Chemical Formula

Table 2 gives it characteristics.

TABLE 2

TONE 0260

| | | | |
|---|---|---|---|
| Molecular weight | 3000 | Acid No. mg KOH/g | 0.09 |
| Melting point C. | 50–60 | Viscosity, 55 C., cps | 1500 |
| Hydroxyl No. mg KOH/g | 37 | VOC, % | 0.29 |

The A-1100 silane was obtained from OSi Specialties and has the following formula and characteristics:

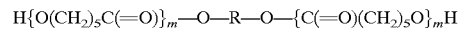

| gamma-aminopropyltriethoxysilane $H_2NCH_2CH_2CH_2Si(OEt)_3$ | |
|---|---|
| Molecular weight | 221.4 |
| Specific gravity | 0.946 |
| | Clear liquid |

The sizing formulations were mixed and prepared on the day of the forming run. Each formulation totaled approximately 2,800 grams. All ingredients minus the silane A1100 (obtained from OSi Specialties of Witco were melted and blended thoroughly at a temperature of from 275° F. to 325° F. The mixture was then cooled below 250° F. and the A1100 silane was added and blended thoroughly.

The forming operation was to prepare a T-filament with the applicator temperature being from 255° F. to 270° F. for the A and C formulations and 290° F. to 305° F. for the B formulation. After running the first package, the powders were added to the desired level, mixed, then run in the forming process. The powder added was ORGASOL 2001 UD NAT 2 (obtained from Elf Atochem) (5 micron diameter; pa 12 nylon; 366° F. melt point). Formulas A and C were run with 0%, 5%, 10%, and 15% powder levels. Formula B was run with 0%, 5%, and 10% only.

The packages treated with the various formulations were then run through an oven for one pass. The formulations without powder were passed through the oven at 380° F., whereas the formulations containing powder were passed through the oven at 450° F.

Dry blend samples were prepared having 30% glass and 70% polymer by weight. Then ½" long fiber pieces of glass were tested in a "10-Second Littleford Blend" test to determine whether the glass held its bundle; the test also looked for low fuzz.

| | 10-Second Littleford Blend Rating | | |
|---|---|---|---|
| | | Cratec Oven | Blend Rating |
| C | 0% | None | 4.5 |
| C | 0% | 380° F. | 4.0 |
| C | 5% | 380° F. + 450° F. | 3.5 |
| C | 15% | 380° F. + 450° F. | 3.5 |
| B | 0% | None | 3.5 |
| B | 0% | 380° F. | 4.0 |
| B | 5% | 380° F. + 450° F. | 4.0 |
| B | 15% | 380° F. + 450° F. | 4.5 |

Scale
1 = worst
5 = best
−3 minimum requirement

What is claimed:

1. A nonaqueous sizing composition for application to glass reinforcing fibers comprising:
   (a) one or more film formers having a molecular weight below 8,000, said one or more film formers selected from the group consisting of high molecular weight waxes, lower molecular weight waxes, lower molecular weight polyester alkyds, polycaprolactones, and low molecular weight maleated polypropylenes;
   (b) one or more coupling agents; and
   (c) one or more nylon powders having a molecular weight from about 12,000 to about 65,000.

2. The nonaqueous sizing composition of claim 1, wherein said coupling agent is selected from the group consisting of 3-glycidoxypropyltrimethoxy silane, 3-methacryloxypropyltrimehtoxy silane and 3-aminopropyltrimethoxy silane.

3. The nonaquoeous sizing composition of claim 1, wherein said film formers are to be miscible with polymers selected from the group consisting of nylon, polypropylene, polybutyl terephalate, chemically coupled polypropylene, polycarbonate, polyphenylene sulfide, thermoplastic polyurethane, acetal, and high density polyethylene.

4. The non-aqueous sizing composition of claim 3 wherein the nylon is selected from the group consisting essentially of nylon 6 and nylon 66.

TABLE 3

Forming Conditions: NEAT Dry Blending Formulations

| | A0 A5 A15 | B0 | B5 | B15 | B15-2 | B16-3 | C0 | C5 | C10 | C15 |
|---|---|---|---|---|---|---|---|---|---|---|
| Applicator Temp ° F. | 250 | 256 | 255 | | | | 250 | 250->270 | | 270 |
| Size Pot, ° F. | 225 | 255 | 235 | | | | 244 | 265 | | 279 |
| Shoe Temp, ° F. | 251 | 257 | 260 | | | | 257 | 280 | | 275 |
| Hose Temp, ° F. | 264 | 264 | 265 | | | | 258 | 274 | | 286 |
| Pump, Hz | 82 | 82 | 82 | | 40 | | 82 | 82 | | 82 |
| Roll, Hz | 27 | 16 | 14 | | 9 | | 24 | 24? | | 17 |
| Package LOI, % | | 7.50% | 7.61% | 6.61% | | | 5.43% | 5.25% | 5.33% | |
| Chopped Strand LOI, % | | 7.40% | 6.40% | 5.76% | | | 5.55% | 5.35% | 5.26% | |
| Comments | | (a) | | (h) | (c) | (d) | (b) | (e) | (f) | (g) |

0, 5, 15% Powder
(a) Very good coverage on roll; no evidence of "splits"; each fiber appears well coated
(b) Coating goes to sides of roll; moderate "split" strand structure; coating uniformity uncertain
(c) 12" side air knife @ 8 ~ 12" away from fan on operator side; ~36" below bushing
(d) Low LOI condition; ran OK?
(e) 113 gm powder added to 2150 gm 0% mixture
(f) 97 gm of powder added to 1650 gm 5% mixture
(g) 75 gm of powder added to 1150 gm 10% mixture 186 gm of powder added to 1500 gm 5% mixture

TABLE 4

Mechanical Property Data

| Filament Diameter (microns) | Description | Tensile dry ksi | Tensile modular (psi × $10^6$) | Tensile 24 hr boil ksi | % Ret. | Flexural strength ksi | Flexural modulus (psi × $10^6$) | Notch Izod (ft-lb/in) | Unnotch Izod (ft-lb) | Glass Content (%) |
|---|---|---|---|---|---|---|---|---|---|---|
| 16 | Commercial, mold at 420 F. | 16.4 | 1.14 | 13.8 | 84 | 23.4 | 0.81 | 4.2 | 15.3 | 30.5 |
| 23 | test, mold at 460 F. | 14.5 | 1.03 | 10.6 | 73 | 20.5 | 0.78 | 5.2 | 14.0 | 29.4 |
| 20 | test, mold at 460 F. | 14.9 | 1.05 | 10.3 | 69 | 21.8 | 0.78 | 5.0 | 15.1 | 28.7 |
| 16 | test, mold at 460 F. | 14.9 | 1.01 | 10.2 | 68 | 22.5 | 0.77 | 4.9 | 14.6 | 29.9 |

5. Glass fibers having at least a portion of their surfaces covered with the dried residue of a nonaqueous sizing composition containing the composition of claim 1.

6. A process for producing a glass fiber having improved processability and notched izod comprising the steps of:
   (a) forming a glass fiber strand; and
   (b) coating said glass fiber strand with the nonaqueous sizing composition of claim 1.

7. A nonaqueous sizing composition for application to glass reinforcing fibers comprising:
   (a) one or more film formers having a molecular weight below 8,000 that are miscible with nylon, said one or film formers selected from the group consisting of amorphous waxes, microcrystalline waxes, maleated low molecular weight polypropylenes, and hydrocarbon resins;
   (b) one or more coupling agents; and
   (c) one or more nylon powders having a molecular weight from about 12,000 to about 65,000.

8. The nonaqueous sizing composition of claim 7, wherein said one or more film formers comprises polycaprolactone and said one or more coupling agents comprises an amino silane coupling comprise amino silanes.

9. Glass fibers having at least a portion of their surfaces covered with the dried residue of a nonaqueous sizing composition containing the composition of claim 7.

10. A process for producing a glass fiber having improved processability and notched izod comprising the steps of:
    (a) forming a glass fiber strand; and
    (b) coating said glass fiber strand with the nonaqueous sizing composition of claim 7.

11. A nonaqueous sizing composition for application to glass reinforcing fibers comprising:
    (a) one or more film formers having a molecular weight below 8,000 that are miscible with nylon, said one or more film formers selected from the group consisting of low molecular weight polyurethanes, polycaprolactones, polyesters, and unsaturated polyesters;
    (b) one or more coupling agents; and
    (c) one or more nylon powders having a molecular weight from about 12,000 to about 65,000.

12. The nonaqueous sizing composition of claim 11, waxes and said one or more coupling agents comprise amino silanes.

13. The nonaqueous sizing or claim 11, wherein said film formers are amorphous waxes; said coupling agents are amino silanes; and said one or more nylon powders having a molecular weight from about 12,000 to about 65,000.

14. Glass fibers having at least a portion of their surfaces covered with the dried residue of a nonaqueous sizing composition containing the composition of claim 11.

15. A process for producing a glass fiber having improved processability and notched izod comprising the steps of:
    (a) forming a glass fiber strand; and
    (b) coating said glass fiber strand with the nonaqueous sizing composition of claim 11.

16. A nonaqueous sizing composition for application to glass fibers for reinforcing nylon comprising:
    (a) an amorphous wax film former;
    (b) an amino silane coupling agent; and
    (c) one or more nylon powders.

17. The nonaqueous sizing composition of claim 16 further comprising one or more film molecular weight polyurethanes, polyesters, and unsaturated polyesters.

18. A nonaqueous sizing composition for application to glass fibers for reinforcing nylon comprising:
    (a) an amorphous wax film former;
    (b) an amino silane coupling agent; and
    (c) one or more nylon powders.

19. The nonaqueous sizing composition sizing of claim 18 further comprising one or more film formers selected from the group consisting of microcrystalline waxes, maleated low molecular weight polypropylenes, and hydrocarbon resins.

* * * * *